(12) United States Patent
Blyumen et al.

(10) Patent No.: US 12,411,840 B2
(45) Date of Patent: Sep. 9, 2025

(54) EMBEDDING BASED HETEROGENOUS DATASET EVALUATION

(71) Applicant: International Business Machines Corporation, Armonk, NY (US)

(72) Inventors: Julia Blyumen, Scotts Valley, CA (US); Michael Joseph Loughran, Naas (IE); Patrick Gerald O'Sullivan, Cork (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/474,381

(22) Filed: Sep. 26, 2023

(65) Prior Publication Data

US 2025/0103590 A1    Mar. 27, 2025

(51) Int. Cl.
*G06F 16/242* (2019.01)
*G06F 16/22* (2019.01)

(52) U.S. Cl.
CPC ........ *G06F 16/243* (2019.01); *G06F 16/2282* (2019.01); *G06F 16/2438* (2019.01)

(58) Field of Classification Search
CPC ............... G06F 16/243; G06F 16/2282; G06F 16/2438; G06F 16/3347
See application file for complete search history.

(56) References Cited

U.S. PATENT DOCUMENTS

| | | | |
|---|---|---|---|
| 10,198,471 B2 * | 2/2019 | He | G06F 16/951 |
| 11,301,473 B1 | 4/2022 | Swain | |
| 11,960,484 B2 * | 4/2024 | Agrawal | G06F 16/221 |
| 2013/0097157 A1 * | 4/2013 | Ng | G06F 16/248 |
| | | | 707/723 |
| 2018/0157633 A1 * | 6/2018 | He | G06F 16/284 |
| 2020/0257665 A1 | 8/2020 | Yan et al. | |
| 2021/0158176 A1 * | 5/2021 | Wan | G06F 18/22 |
| 2021/0240677 A1 * | 8/2021 | Kashalikar | G06N 5/046 |
| 2021/0365443 A1 | 11/2021 | Mostafa et al. | |
| 2021/0397792 A1 | 12/2021 | Atallah et al. | |
| 2022/0121669 A1 * | 4/2022 | Roitman | G06F 16/2282 |
| 2022/0215325 A1 * | 7/2022 | Odibat | G06Q 10/063114 |

(Continued)

OTHER PUBLICATIONS

Trabelsi et al., Relational Graph Embeddings for Table Retrieval, 2020 IEEE International Conference on Big Data (Big Data), Dec. 10-13, 2020.

(Continued)

*Primary Examiner* — William P Bartlett

(74) *Attorney, Agent, or Firm* — Garg Law Firm, PLLC; Rakesh Garg; Jared Chaney

(57) ABSTRACT

An embodiment generates, using a trained document embedding model, a plurality of table embeddings, each table embedding in the plurality of table embeddings representing a table in a dataset. An embodiment generates, using the trained document embedding model, a query embedding, the query embedding representing a natural language query regarding the dataset. An embodiment identifies a set of responsive tables, the set of responsive tables comprising a first table in the dataset, the first table in the dataset represented by a first table embedding, the first table embedding and the query embedding having a similarity score above a similarity score threshold.

20 Claims, 8 Drawing Sheets

(56) References Cited

U.S. PATENT DOCUMENTS

2023/0153284 A1    5/2023    Walters et al.
2023/0297332 A1*  9/2023    Orgad ................... G06F 16/221
                                                                     707/753
2023/0394016 A1*  12/2023  Dong ................. G06F 16/2455

OTHER PUBLICATIONS

Colyer, Using Word Embedding to Enable Semantic Queries on Relational Databases, Jul. 6, 2017.
Efthymiou et al., Matching Web Tables with Knowledge Base Entities: From Entity Lookups to Entity Embeddings, ISWC, Oct. 2017.
Ghasemi-Gol et al., TabVec: Table Vectors for Classification of Web Tables, Feb. 17, 2018.
Trabelsi et al., Improved Table Retrieval Using Multiple Context Embeddings for Attributes, 2019 IEEE International Conference on Big Data (Big Data), Dec. 9-12, 2019.
Fernandez et al., Seeping Semantics: Linking Datasets using Word Embeddings for Data Discovery, 2018 IEEE 34th International Conference on Data Engineering (ICDE), Apr. 16-19, 2018.
Desagulier, Word embeddings: the (very) basics, Apr. 25, 2018, https://corpling.hypotheses.org/495.
Karani, Introduction to Word Embedding and Word2Vec, Sep. 1, 2018, https://towardsdatascience.com/introduction-to-word-embedding-and-word2vec-652d0c2060fa.
Jurafsky et al., Vector Semantics and Embeddings, 2023.
Wikipedia. "Metadata discovery", retrieved from web https://en.wikipedia.org/wiki/Metadata_discovery, dated May 9, 2025, 3 pages.

* cited by examiner

*Fig. 5*

TABLE REPRESENTATIONS 510:

Tables[1] = TaggedDocument (words=['Identifier', 'Name', 'City', 'Date of birth'........], tags=['Customer', 'Table_1']
Tables[2] = TaggedDocument (words=['Customer Identifier', 'Revenue Year to Date',........], tags=['Customer Revenue', 'Table_2']
Tables[3] = TaggedDocument (words=['Customer Identifier', 'Cost Year to Date',........], tags=['Customer Cost', 'Table_3']
...........
Tables[n] = TaggedDocument (words=['col1', 'col2', 'col3'........], tags=['Table_Name', 'Table_n']

TRAINED DOCUMENT EMBEDDING MODEL
520

TABLE EMBEDDINGS 530:

Tables[1]_embedding
Tables[2]_embedding
Tables[3]_embedding
..........
Tables[n]_embedding

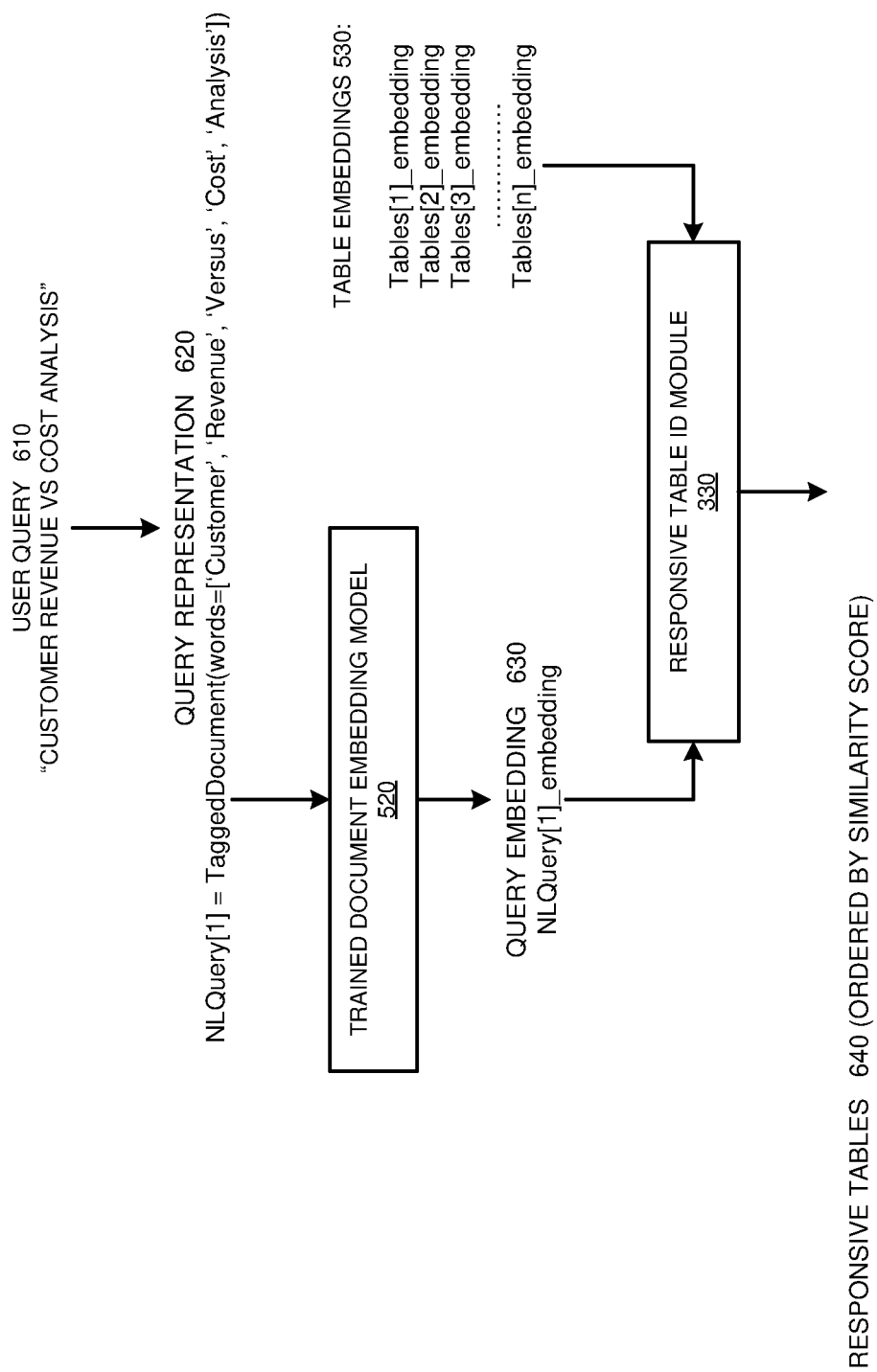

Fig. 7

RESPONSIVE TABLES  640 (ORDERED BY SIMILARITY SCORE)

similarity = 0.245, Tables[2] = TaggedDocument (words=['Customer Identifier', 'Revenue Year to Date', .......], tags=['Customer Revenue', 'Table_2']
similarity = 0.230, Tables[3] = TaggedDocument (words=['Customer Identifier', 'Cost Year to Date', .......], tags=['Customer Cost', 'Table_3']
similarity = 0.2, Tables[1] = TaggedDocument (words=['Identifier', 'Name', 'City', 'Date of birth' .......], tags=['Customer', 'Table_1'])

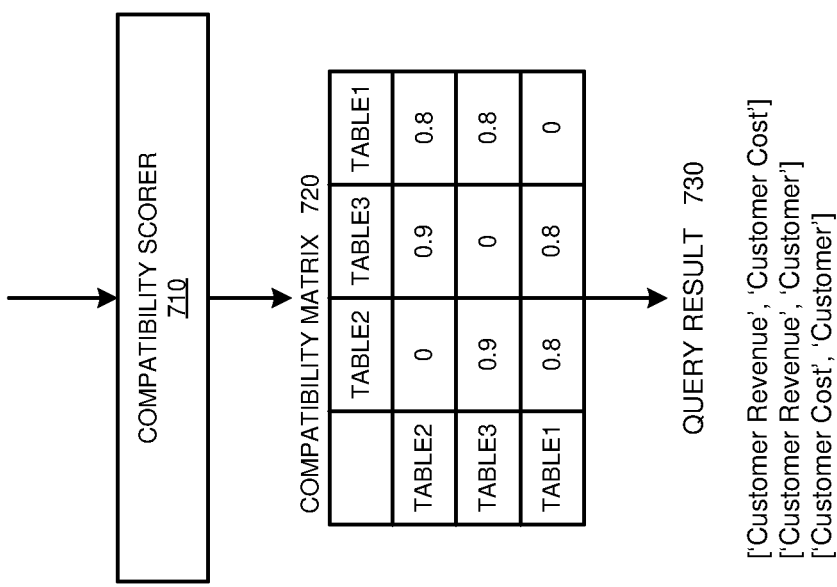

COMPATIBILITY SCORER  710

COMPATIBILITY MATRIX  720

|  | TABLE2 | TABLE3 | TABLE1 |
|---|---|---|---|
| TABLE2 | 0 | 0.9 | 0.8 |
| TABLE3 | 0.9 | 0 | 0.8 |
| TABLE1 | 0.8 | 0.8 | 0 |

QUERY RESULT  730

['Customer Revenue', 'Customer Cost']
['Customer Revenue', 'Customer']
['Customer Cost', 'Customer']

EMBEDDING BASED HETEROGENOUS DATASET EVALUATION

BACKGROUND

The present invention relates generally to dataset management. More particularly, the present invention relates to a method, system, and computer program for embedding based heterogenous dataset evaluation.

A dataset or database is a logical container used to organize and control access to resources such as stored data. A dataset typically includes one or more tables. A table stores data values using a model of labelled columns (also referred to as fields) and rows. A cell of the table is an intersection of a row and a column. Typically, column labels designate a particular type of data (for example, a table might have columns labelled "Customer ID", "Name", "Address", and "Telephone Number"), and rows hold data for particular individuals (e.g., data for Customer A might be stored in row 1 and data for Customer B might be stored in row 2). A table typically has a specified number of columns, but can have any number of rows. A specific choice of columns which uniquely identify rows is called the primary key. For example, a customer identifier that is unique to each customer might be a primary key in a table holding customer records. A schema is a description of the structure of a dataset, expressed in a formal language, including a description of each table's column names, data types, and other information.

Metadata describes the data in a dataset, and is stored either within a data store holding the dataset or externally in a metadata store, such as a catalog or registry of datasets that might be available for a user to use. Some metadata is created manually by human data experts, and some is extracted using computer-implemented analysis techniques. Metadata coming from different catalogs is likely to be heterogenous in scope and nature. For example, some catalogs might contain fields like "column tags" and "table description," while others might contain fields "column classification" and "table entities"). Schema-based metadata describes schemas, tables, and table columns, while entity-based metadata describes table rows and actual values within table rows.

SUMMARY

The illustrative embodiments provide for embedding based heterogenous dataset evaluation. An embodiment includes generating, using a trained document embedding model, a plurality of table embeddings, each table embedding in the plurality of table embeddings representing a table in a dataset. An embodiment includes generating, using the trained document embedding model, a query embedding, the query embedding representing a natural language query regarding the dataset. An embodiment includes identifying a set of responsive tables, the set of responsive tables comprising a first table in the dataset, the first table in the dataset represented by a first table embedding, the first table embedding and the query embedding having a similarity score above a similarity score threshold. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

FIG. 5 depicts a continued example of embedding based heterogenous dataset evaluation in accordance with an illustrative embodiment;

FIG. 6 depicts a continued example of embedding based heterogenous dataset evaluation in accordance with an illustrative embodiment;

FIG. 7 depicts a continued example of embedding based heterogenous dataset evaluation in accordance with an illustrative embodiment.

DETAILED DESCRIPTION

Figure 1:
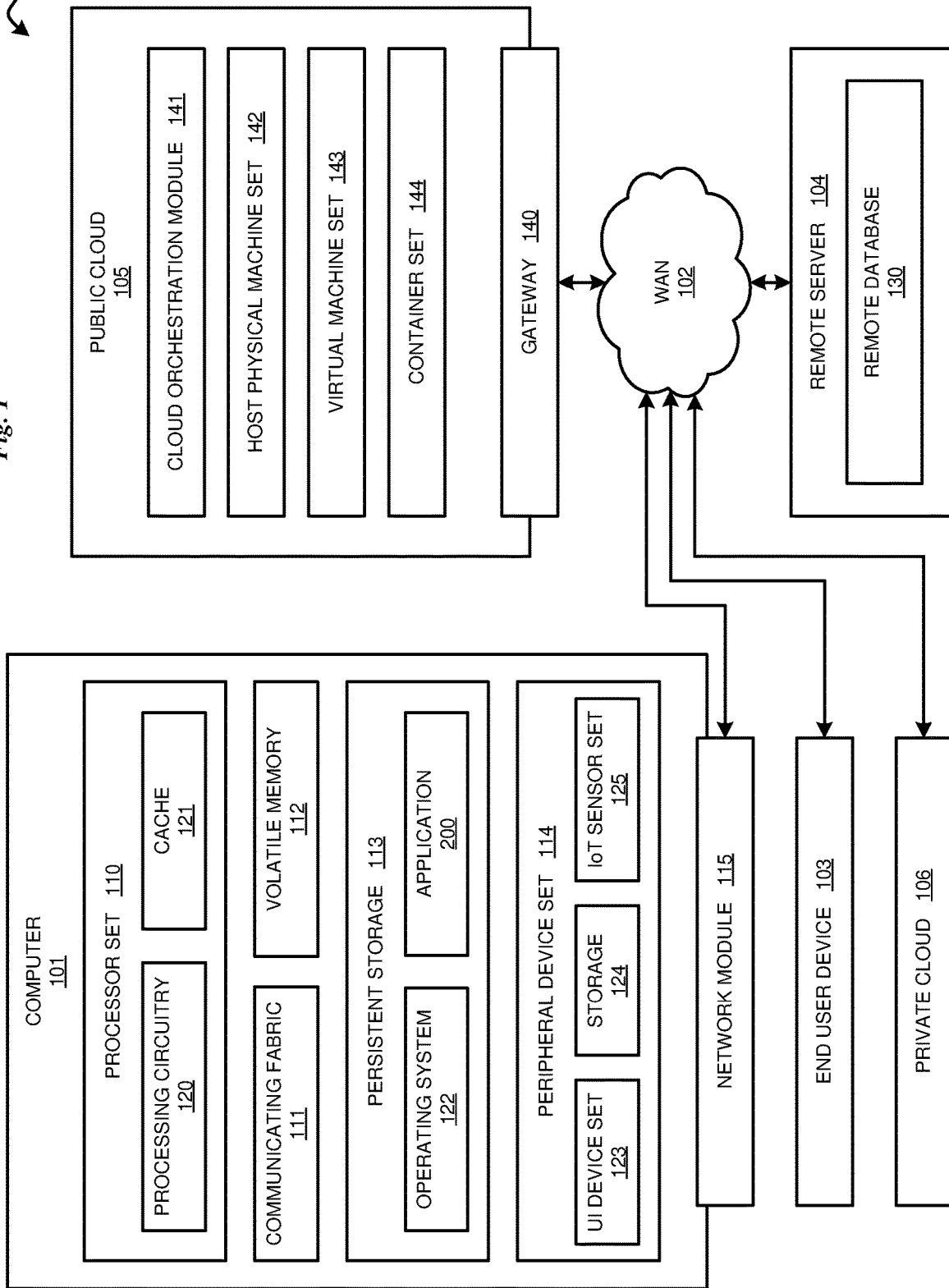
FIG. 1 depicts a block diagram of a computing environment in accordance with an illustrative embodiment.

The illustrative embodiments recognize that users simply want relevant data to analyze, regardless of the data's source or how a particular dataset is organized. However, an organization's datasets often come from different sources, were collected at different times, use different schemas, are spread across multiple cloud providers and on-premise data stores, and cataloged in multiple metadata stores. Users often spend more time finding relevant data than using the data once found, often because individually collected pieces of data cannot be joined and used together. Thus, users need to have a way of finding compatible data across disparate data and metadata stores to be used in a single analysis.

One existing approach to data unification is to build an integrated schema of data in multiple datasets, but due to privacy and performance considerations many metadata discovery engines will only extract schema-based metadata, not entity-based metadata. Another existing approach to data unification is to construct an ontology, by arranging metadata into a conceptual structure of entities and their relationships within a given knowledge domain. However, given the disparate nature of datasets and the users that assemble datasets, top-down creation of global ontologies is often not possible. In addition, both approaches require anticipation of a user's particular needs, and are thus not sufficiently flexible. Thus, the illustrative embodiments recognize that there is a need to identify compatible data for analysis, across disjoined data stores and disparate data sets, in response to a user query, without relying on an integrated scheme or an ontology.

The present disclosure addresses the deficiencies described above by providing a process (as well as a system, method, machine-readable medium, etc.) that, using a trained document embedding model, generates a plurality of table embeddings and a query embedding, and identifies a set of responsive tables, the set of responsive tables comprising a first table represented by a first table embedding, the first table embedding and the query embedding having a similarity score above a similarity score threshold Thus, the illustrative embodiments provide for embedding based heterogenous dataset evaluation.

An illustrative embodiment receives data of one or more tables, from a corpus including one or more datasets. In one embodiment, data of the one or more tables includes schema-based metadata as well as entity-based metadata and the data stored within the table. In another embodiment, data of the one or more tables includes only schema-based metadata describing the table (e.g., the table name) and its columns (e.g., the column labels or column names).

An embodiment uses a presently available technique to expand an abbreviated column name of a table into an unabbreviated form. For example, an embodiment might expand a column name of "CustID" into "Customer Identification" or "Customer Identifier". An embodiment also uses a presently available technique to normalize variations on particular column names into one standard form. For example, an embodiment might normalize a column name of "Customer Identification" into "Customer Identifier". Column name expansion is performed because presently available techniques for generating table embeddings (described elsewhere herein) do not perform well on abbreviated words. Column name expansion and normalization also imposes some standardization across tables being compared, thus improving similarity scoring (described elsewhere herein).

A trained document embedding model is a presently available technique that generates a numerical representation (also called an embedding or a vector) of a document. The closer two vectors are in a vector space, the more similar in meaning are the documents those vectors represent. Documents (and hence document similarity) are represented by embeddings based on the fact that similar documents have similar vectors because similar documents tend to have similar words. Thus, treating metadata stores (catalogs or repositories) as a corpus, and datasets' metadata as documents within the corpus, enables creation of a vector space corresponding to a heterogenous corpus of datasets, and each table within a dataset is uniformly represented as an embedding that can be compared to other embeddings representing other dataset tables. One non-limiting example of a presently available trained document embedding model is doc2vec.

An embodiment generates a table representation. A table representation represents a table in a structured form, by treating the expanded and normalized column names of the table as words in a document for which a trained document embedding model is to generate an embedding. In one embodiment, the structured form is a document input format for a presently available trained document embedding model. For example, in an embodiment using one presently available doc2vec implementation, the embodiment uses the implementation's built-in TaggedDocument( ) function, with the expanded and normalized column names of the table used as input words to the function, to generate the table representation.

An embodiment uses a trained document embedding model to generate a table embedding representing a table in a dataset. One embodiment inputs the table representation of a particular table to the model, which outputs a corresponding embedding. For example, an embodiment using one presently available doc2vec implementation inputs the table representation generated using the TaggedDocument( ) function, with the expanded and normalized column names of the table used as input words to the function, to the doc2vec implementation, which outputs a corresponding table embedding.

An embodiment expands an abbreviated column name of a table into an unabbreviated form, normalizes variations on particular column names into one standard form, generates a table representation, and generates a table embedding for one or more additional tables in one or more datasets. An embodiment stores table embeddings, as well as data relating a particular table embedding to a particular table in a particular dataset, in a corpus of dataset tables available to respond to a user query. Thus, an embodiment provides for indexing datasets of heterogeneous metadata, using a table embedding to represent a particular table in one of the datasets. One embodiment expands an abbreviated column name of a table into an unabbreviated form, normalizes variations on particular column names into one standard form, generates a table representation, and generates a table embedding for a new table added to an existing dataset, for tables in a new dataset made available for use by a user of an embodiment, or for a table having metadata that has changed by more than a threshold amount.

Because the closer two vectors are in a vector space, the more similar in meaning are the documents those vectors represent. Thus, an embodiment identifies tables that have above a threshold amount of similarity with each other by measuring a similarity between the tables' corresponding table embeddings.

An embodiment receives a natural language query regarding a dataset for which an embodiment has generated table embeddings. An embodiment uses a presently available technique to expand an abbreviated word in the query into an unabbreviated form, uses a presently available technique to normalize variations on particular column names into one standard form, generates a table representation. An embodiment generates a query representation. A query representation represents a query in a structured form, by treating words of the query as words in a document for which a trained document embedding model is to generate an embedding. In one embodiment, the structured form is a document input format for a presently available trained document embedding model. For example, in an embodiment using one presently available doc2vec implementation, the embodiment uses the implementation's built-in TaggedDocument( ) function, with (possibly-expanded) words of the query used as input words to the function, to generate the query representation.

An embodiment uses the same trained document embedding model as was used to generate table embeddings to generate a query embedding representing the user's natural language query. One embodiment inputs the query representation of a particular query to the model, which outputs a corresponding embedding. For example, an embodiment using one presently available doc2vec implementation inputs the query representation generated using the TaggedDocument( ) function, with (possibly-expanded) words of the query used as input words to the function, to the doc2vec implementation, which outputs a corresponding query embedding.

Typically, queries include a metric (e.g., interest rate or product cost) and a qualifier of the metric. Some non-limiting examples of qualifiers are dimension (e.g., by location), entity (e.g., a particular country or product), granularity (e.g., for the whole country or a particular state or zip code), and time coverage (e.g., in the last three years). Thus, one embodiment uses a presently available natural language understanding technique to identify particular semantic elements of a query and weight particular query elements differently when generating a query embedding.

Because the closer two vectors are in a vector space, the more similar in meaning are the documents those vectors represent. Thus, an embodiment identifies one or more tables that have above a threshold amount of similarity with a query by measuring a similarity between table embeddings and a query embedding. In particular, an embodiment computes a similarity score between a query embedding corresponding to a user query and one or more table embeddings. The table embeddings each represent a particular table in a dataset available to be used to respond to the user query. One non-limiting example of a presently available technique to compute a similarity score between embeddings is cosine similarity. Some presently available doc2vec implementations include a function that computes similarity between embeddings.

An embodiment identifies a set of responsive tables. Each table in the set of responsive tables has a table embedding with a similarity score with the query embedding that is above a similarity score threshold, and thus includes data that is deemed responsive to the query. An embodiment provides the set of responsive tables to a user in response to the user's query. One embodiment ranks the set of responsive tables by their similarity scores, and provides the ranked list of responsive tables to a user along with the similarity scores of each responsive table.

An embodiment computes a uniqueness score between tables in a subset of the set of responsive tables, for example between pairs of tables or triplets of tables. A uniqueness score is a measure of how much information a given table provides. Uniqueness is similar to term frequency-inverse document frequency (a presently available measure of importance of a word to a document in a collection or corpus, adjusted for the fact that some words appear more frequently in general) but uniqueness measures a frequency of documents appearing in a corpus rather than a frequency of a word in a document. If two tables are equally responsive to a user's query, the table with the higher uniqueness score provides more useful information to a user than the table with the lower uniqueness score.

An embodiment constructs a uniqueness matrix, in which cells of the matrix hold uniqueness scores between tables. For example, if uniqueness scores are computed for pairs of tables, rows and columns of the uniqueness matrix represent tables and each row-column intersection holds a uniqueness score between corresponding tables. An embodiment identifies tables in the set of responsive tables with uniqueness scores with each other above a uniqueness score threshold, and provides those tables to a user in response to the user's query, optionally along with the tables' uniqueness scores.

An embodiment refines the set of responsive tables by identifying, within the set of responsive tables, a set of compatible tables. In particular, an embodiment computes a compatibility score between tables in a subset of the set of responsive tables, for example between pairs of tables or triplets of tables.

A compatibility score, or joinability score, is a measure of how well the tables being scored can be combined to produce a useful result. In other words, the more compatible the tables are with each other, the less work a user will have to do to analyze the data in the tables. However, a user might trade off working with tables that are less compatible with each other if the result is more data available for the user to analyze. One component of a compatibility score is the semantic similarity between tables, as measured by the similarity (e.g., cosine similarity) between the tables' corresponding table embeddings.

Another component of a compatibility score is the similarity between value distributions in the tables. For example, consider Table A, which contains revenue information (a column) for customers John, Mary, Jim, Peter (values), and Table B, which contains cost information (a column) for customers Peter, Anna, Claudia, Josh (values). The only overlap in customers (value) is Peter, and thus the only customer for whom revenue/cost ratio information can be calculated is Peter. As a result, Table A and Table B have a low compatibility score corresponding to the low similarity of the two tables' value distributions. Two non-limiting examples of presently available techniques for comparing value distributions are the chi-squared test and Fishers exact text.

Another component of a compatibility score is the presence of a particular primary key and its value in tables being compared. For example, if tables being compared all have a customer identification column including a sufficiently similar set of values, these tables likely refer to the same customer and are highly compatible with each other.

Another component of a compatibility score is the format of values in tables being compared. For example, if one table stores a customer identification as a numerical value and another table stores a customer identification as an alphanumeric string, converting customer identifications from one format to another is likely to be difficult and error prone, and thus the two tables have a low level of compatibility with each other.

Another component of a compatibility score is a difference between quality measures (e.g., the percentage of missing values) in the tables being compared, because a table with a low quality measure is unlikely to be compatible with a table having a much higher quality measure. Other techniques for computing a compatibility score, and combinations of techniques, are also possible and contemplated within the scope of the illustrative embodiments.

An embodiment constructs a compatibility matrix, in which cells of the matrix hold compatibility scores between tables. For example, if compatibility scores are computed for pairs of tables, rows and columns of the compatibility matrix represent tables and each row-column intersection holds a compatibility score between corresponding tables. An embodiment identifies tables in the set of responsive tables with compatibility scores with each other above a compatibility score threshold as a set of compatible tables. An embodiment provides the set of compatible tables to a user in response to the user's query, optionally along with the tables' compatibility scores. Another embodiment computes a weighted sum of the uniqueness and compatibility matrices for a table in the set of compatible tables, and uses the weighted sum in place of the tables' compatibility scores when providing the set of compatible tables to a user in response to the user's query.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to FIG. 1, this figure depicts a block diagram of a computing environment 100. Computing environment 100 contains an example of an environment for the execution of at least some of the computer code involved in performing the inventive methods, such as application 200 that implements embedding based heterogenous dataset evaluation in accordance with an illustrative embodiment. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Figure 2:
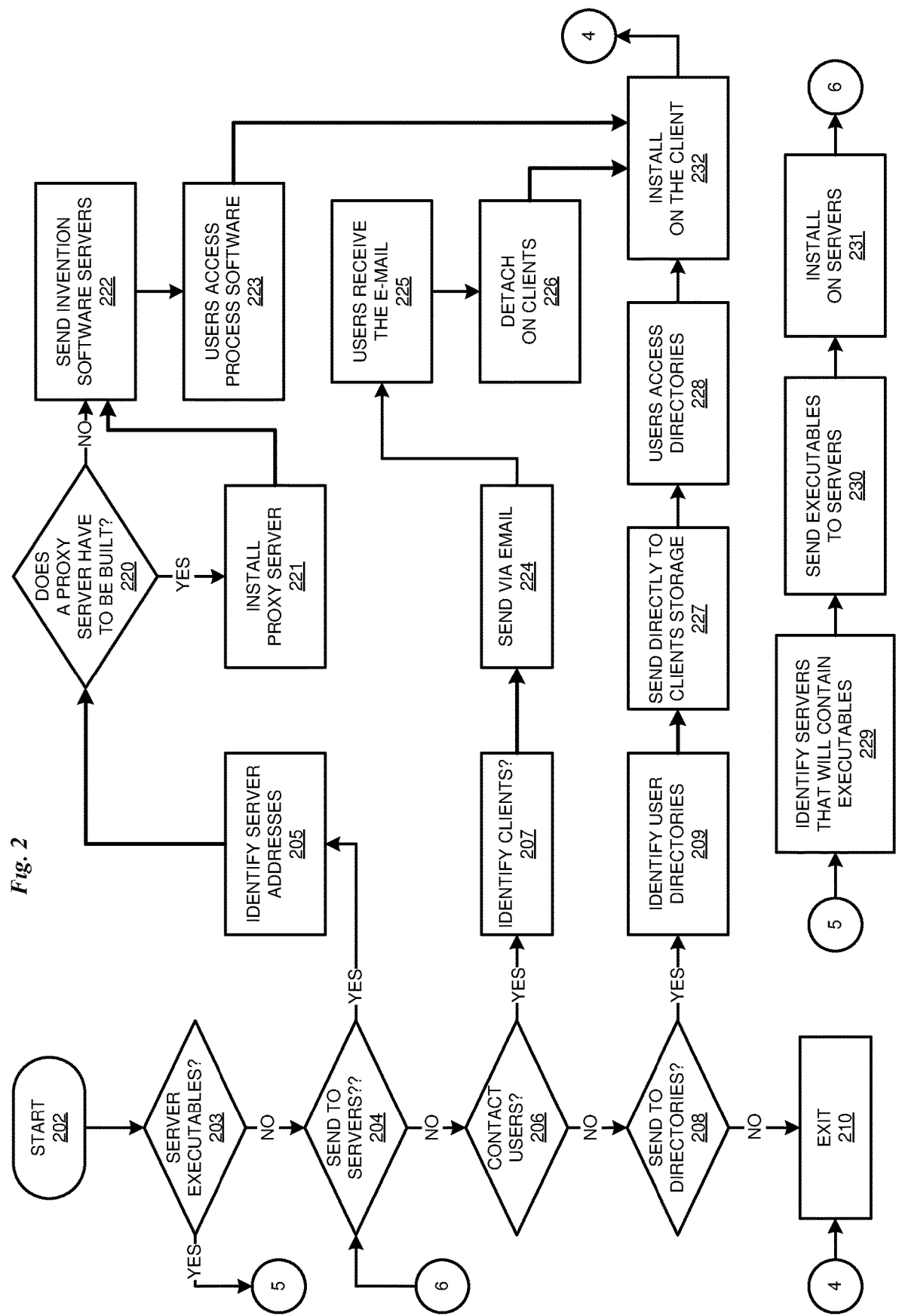
FIG. 2 depicts a flowchart of an example process for loading of process software in accordance with an illustrative embodiment.

With reference to FIG. 2, this figure depicts a flowchart of an example process for loading of process software in accordance with an illustrative embodiment. The flowchart can be executed by a device such as computer 101, end user device 103, remote server 104, or a device in private cloud 106 or public cloud 105 in FIG. 1.

While it is understood that the process software implementing embedding based heterogenous dataset evaluation may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Step 202 begins the deployment of the process software. An initial step is to determine if there are any programs that will reside on a server or servers when the process software is executed (203). If this is the case, then the servers that will contain the executables are identified (229). The process software for the server or servers is transferred directly to the servers' storage via FTP or some other protocol or by copying though the use of a shared file system (230). The process software is then installed on the servers (231).

Next, a determination is made on whether the process software is to be deployed by having users access the process software on a server or servers (204). If the users are to access the process software on servers, then the server addresses that will store the process software are identified (205).

A determination is made if a proxy server is to be built (220) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (221). The process software is sent to the (one or more) servers either via a protocol such as FTP, or it is copied directly from the source files to the server files via file sharing (222). Another embodiment involves sending a transaction to the (one or more) servers that contained the process software, and have the server process the transaction and then receive and copy the process software to the server's file system. Once the process software is stored at the servers, the users via their client computers then access the process software on the servers and copy to their client computers file systems (223). Another embodiment is to have the servers automatically copy the process software to each client and then run the installation program for the process software at each client computer. The user executes the program that installs the process software on his client computer (232) and then exits the process (210).

In step 206 a determination is made whether the process software is to be deployed by sending the process software to users via e-mail. The set of users where the process software will be deployed are identified together with the addresses of the user client computers (207). The process software is sent via e-mail to each of the users' client computers (224). The users then receive the e-mail (225) and then detach the process software from the e-mail to a directory on their client computers (226). The user executes the program that installs the process software on his client computer (232) and then exits the process (210).

Lastly, a determination is made on whether the process software will be sent directly to user directories on their client computers (208). If so, the user directories are identified (209). The process software is transferred directly to the user's client computer directory (227). This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the process software (228). The user executes the program that installs the process software on his client computer (232) and then exits the process (210).

Figure 3:
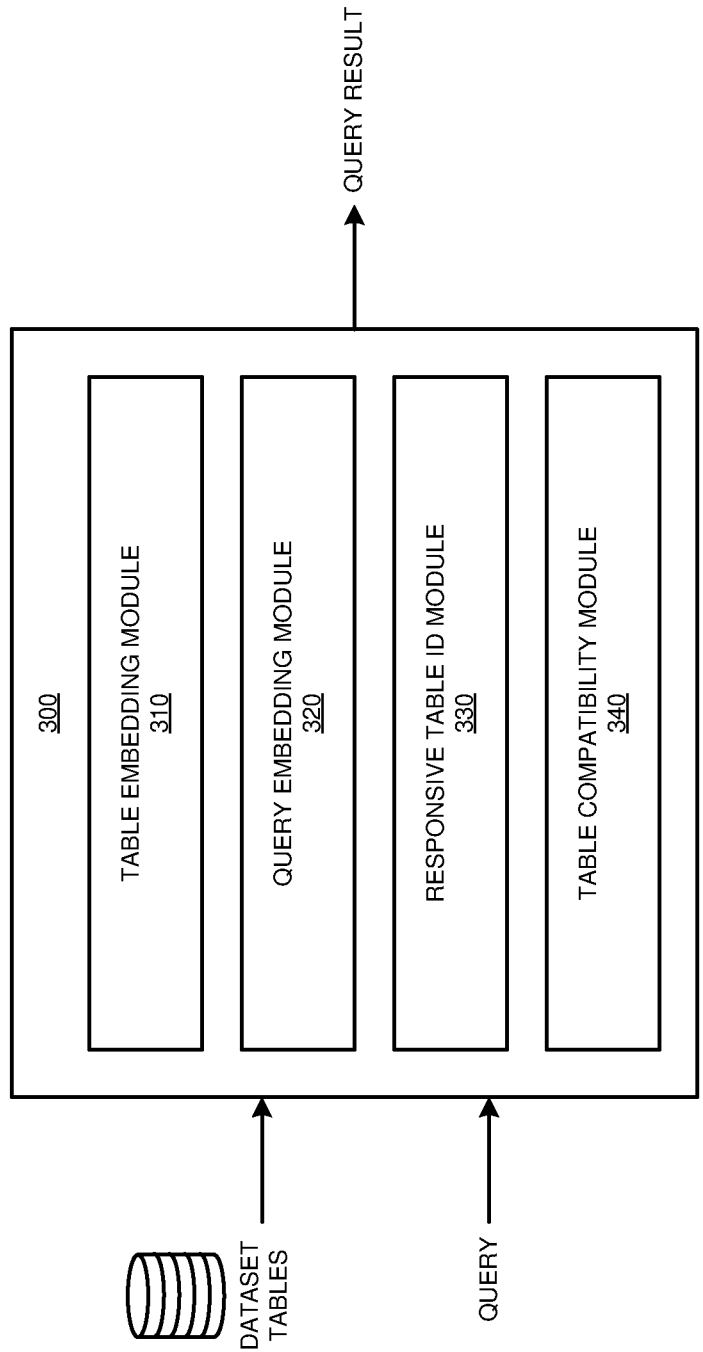
FIG. 3 depicts a block diagram of an example configuration for embedding based heterogenous dataset evaluation in accordance with an illustrative embodiment.

With reference to FIG. 3, this figure depicts a block diagram of an example configuration for embedding based heterogenous dataset evaluation in accordance with an illustrative embodiment. Application 300 is the same as application 200 in FIG. 1.

In the illustrated embodiment, application 300 receives data of one or more tables, from a corpus including one or more datasets. In one implementation of application 300, data of the one or more tables includes schema-based metadata as well as entity-based metadata and the data stored within the table. In another implementation of application 300, data of the one or more tables includes only schema-based metadata describing the table (e.g., the table name) and its columns (e.g., the column labels).

Table embedding module 310 uses a presently available technique to expand an abbreviated column name of a table into an unabbreviated form. For example, module 310 might expand a column name of "CustID" into "Customer Identification" or "Customer Identifier". Module 310 also uses a presently available technique to normalize variations on particular column names into one standard form. For example, module 310 might normalize a column name of "Customer Identification" into "Customer Identifier". Column name expansion is performed because presently available techniques for generating table embeddings (described elsewhere herein) do not perform well on abbreviated words. Column name expansion and normalization also imposes some standardization across tables being compared, thus improving similarity scoring (described elsewhere herein).

A trained document embedding model is a presently available technique that generates a numerical representation (also called an embedding or a vector) of a document. The closer two vectors are in a vector space, the more similar in meaning are the documents those vectors represent. Documents (and hence document similarity) are represented by embeddings based on the fact that similar documents have similar vectors because similar documents tend to have similar words. Thus, treating metadata stores (catalogs or repositories) as a corpus, and datasets' metadata as documents within the corpus, enables creation of a vector space corresponding to a heterogenous corpus of datasets, and each table within a dataset is uniformly represented as an embedding that can be compared to other embeddings representing other dataset tables. One non-limiting example of a presently available trained document embedding model is doc2vec.

Module 310 generates a table representation. A table representation represents a table in a structured form, by treating the expanded and normalized column names of the table as words in a document for which a trained document embedding model is to generate an embedding. In one implementation of module 310, the structured form is a document input format for a presently available trained document embedding model. For example, in an implementation of module 310 using one presently available doc2vec implementation, module 310 uses the implementation's built-in TaggedDocument( ) function, with the expanded and normalized column names of the table used as input words to the function, to generate the table representation.

Module 310 uses a trained document embedding model to generate a table embedding representing a table in a dataset. One implementation of implementation of module 310 inputs the table representation of a particular table to the model, which outputs a corresponding embedding. For example, an implementation of module 310 using one presently available doc2vec implementation inputs the table representation generated using the TaggedDocument( ) function, with the expanded and normalized column names of the table used as input words to the function, to the doc2vec implementation, which outputs a corresponding table embedding.

Module 310 expands an abbreviated column name of a table into an unabbreviated form, normalizes variations on particular column names into one standard form, generates a table representation, and generates a table embedding for one or more additional tables in one or more datasets. Module 310 stores table embeddings, as well as data relating a particular table embedding to a particular table in a particular dataset, in a corpus of dataset tables available to respond to a user query. Thus, application 300 provides for indexing datasets of heterogeneous metadata, using a table embedding to represent a particular table in one of the datasets. One implementation of module 310 expands an abbreviated column name of a table into an unabbreviated form, normalizes variations on particular column names into one standard form, generates a table representation, and generates a table embedding for a new table added to an existing dataset, for tables in a new dataset made available for use by a user of application 300, or for a table having metadata that has changed by more than a threshold amount.

Because the closer two vectors are in a vector space, the more similar in meaning are the documents those vectors represent. Thus, module 310 identifies tables that have above a threshold amount of similarity with each other by measuring a similarity between the tables' corresponding table embeddings.

Query embedding module 320 receives a natural language query regarding a dataset for which an embodiment has generated table embeddings. Module 320 uses a presently available technique to expand an abbreviated word in the query into an unabbreviated form, uses a presently available technique to normalize variations on particular column names into one standard form, generates a table representation. module 320 generates a query representation. A query representation represents a query in a structured form, by treating words of the query as words in a document for which a trained document embedding model is to generate an embedding. In one implementation of module 320, the structured form is a document input format for a presently available trained document embedding model. For example, in an implementation of module 320 using one presently available doc2vec implementation, module 320 uses the implementation's built-in TaggedDocument( ) function, with (possibly-expanded) words of the query used as input words to the function, to generate the query representation.

Module 320 uses the same trained document embedding model as was used to generate table embeddings to generate a query embedding representing the user's natural language query. Module 320 inputs the query representation of a particular query to the model, which outputs a corresponding embedding. For example, an implementation of module 320 using one presently available doc2vec implementation inputs the query representation generated using the TaggedDocument( ) function, with (possibly-expanded) words of the query used as input words to the function, to the doc2vec implementation, which outputs a corresponding query embedding.

Typically, queries include a metric (e.g., interest rate or product cost) and a qualifier of the metric. Some non-limiting examples of qualifiers are dimension (e.g., by location), entity (e.g., a particular country or product), granularity (e.g., for the whole country or a particular state or zip code), and time coverage (e.g., in the last three years). Thus, one implementation of module 320 uses a presently available natural language understanding technique to identify particular semantic elements of a query and weight particular query elements differently when generating a query embedding.

Because the closer two vectors are in a vector space, the more similar in meaning are the documents those vectors represent. Thus, responsive query ID module 330 identifies one or more tables that have above a threshold amount of similarity with a query by measuring a similarity between table embeddings and a query embedding. In particular, module 330 computes a similarity score between a query embedding corresponding to a user query and one or more table embeddings. The table embeddings each represent a particular table in a dataset available to be used to respond to the user query. One non-limiting example of a presently available technique to compute a similarity score between embeddings is cosine similarity. Some presently available doc2vec implementations include a function that computes similarity between embeddings.

Module 330 identifies a set of responsive tables. Each table in the set of responsive tables has a table embedding with a similarity score with the query embedding that is above a similarity score threshold, and thus includes data that is deemed responsive to the query. Module 330 provides the set of responsive tables to a user in response to the user's query. One implementation of module 330 ranks the set of responsive tables by their similarity scores, and provides the ranked list of responsive tables to a user along with the similarity scores of each responsive table.

Module 330 computes a uniqueness score between tables in a subset of the set of responsive tables, for example between pairs of tables or triplets of tables.

Module 330 constructs a uniqueness matrix, in which cells of the matrix hold uniqueness scores between tables. For example, if uniqueness scores are computed for pairs of tables, rows and columns of the uniqueness matrix represent tables and each row-column intersection holds a uniqueness score between corresponding tables. Module 330 identifies tables in the set of responsive tables with uniqueness scores with each other above a uniqueness score threshold, and provides those tables to a user in response to the user's query, optionally along with the tables' uniqueness scores.

Table compatibility module 340 refines the set of responsive tables by identifying, within the set of responsive tables, a set of compatible tables. In particular, module 340 computes a compatibility score between tables in a subset of the set of responsive tables, for example between pairs of tables or triplets of tables.

A compatibility score, or joinability score, is a measure of how well the tables being scored can be combined to produce a useful result. In other words, the more compatible the tables are with each other, the less work a user will have to do to analyze the data in the tables. However, a user might trade off working with tables that are less compatible with each other if the result is more data available for the user to analyze. One component of a compatibility score is the semantic similarity between tables, as measured by the similarity (e.g., cosine similarity) between the tables' corresponding table embeddings.

Another component of a compatibility score is the similarity between value distributions in the tables. For example, consider Table A, which contains revenue information (a column) for customers John, Mary, Jim, Peter (values), and Table B, which contains cost information (a column) for customers Peter, Anna, Claudia, Josh (values). The only overlap in customers (value) is Peter, and thus the only customer for whom revenue/cost ratio information can be calculated is Peter. As a result, Table A and Table B have a low compatibility score corresponding to the low similarity of the two tables' value distributions. Two non-limiting examples of presently available techniques for comparing value distributions are the chi-squared test and Fishers exact text.

Another component of a compatibility score is the presence of a particular primary key and its value in tables being compared. For example, if tables being compared all have a customer identification column including a sufficiently similar set of values, these tables likely refer to the same customer and are highly compatible with each other.

Another component of a compatibility score is the format of values in tables being compared. For example, if one table stores a customer identification as a numerical value and another table stores a customer identification as an alphanumeric string, converting customer identifications from one format to another is likely to be difficult and error prone, and thus the two tables have a low level of compatibility with each other.

Another component of a compatibility score is a difference between quality measures (e.g., the percentage of missing values) in the tables being compared, because a table with a low quality measure is unlikely to be compatible with a table having a much higher quality measure. Other techniques for computing a compatibility score, and combinations of techniques, are also possible.

Module 340 constructs a compatibility matrix, in which cells of the matrix hold compatibility scores between tables. For example, if compatibility scores are computed for pairs of tables, rows and columns of the compatibility matrix represent tables and each row-column intersection holds a compatibility score between corresponding tables. Module 340 identifies tables in the set of responsive tables with compatibility scores with each other above a compatibility score threshold as a set of compatible tables. Module 340 provides the set of compatible tables to a user in response to the user's query, optionally along with the tables' compatibility scores. Another implementation of module 340 computes a weighted sum of the uniqueness and compatibility matrices for a table in the set of compatible tables, and uses the weighted sum in place of the tables' compatibility scores when providing the set of compatible tables to a user in response to the user's query.

Figure 4:
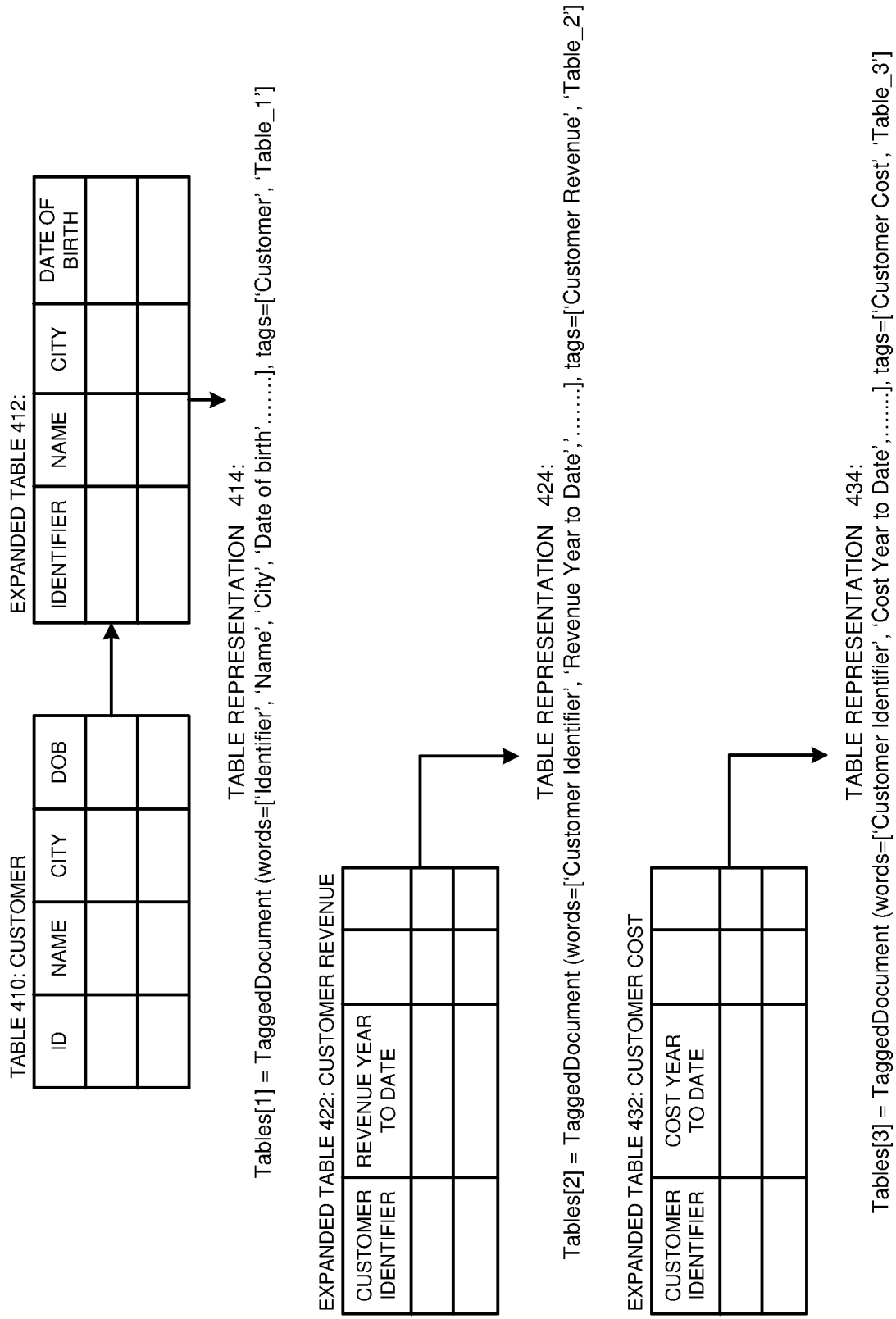
FIG. 4 depicts an example of embedding based heterogenous dataset evaluation in accordance with an illustrative embodiment.

With reference to FIG. 4, this figure depicts an example of embedding based heterogenous dataset evaluation in accordance with an illustrative embodiment. The example can be executed using application 300 in FIG. 3.

Table 410, labelled Customer, depicts schema-based metadata of a table in a dataset. Expanded table 412 depicts an expanded form of table 410, in which "ID" (an abbreviated form) has been expanded into "Identifier" (an unabbreviated form). Table representation 414 depicts a table representation of expanded table 412 using the TaggedDocument( ) function, with the expanded and normalized column names of the table used as input words to the function.

Expanded table 422, labelled Customer Revenue, depicts an expanded form of another table in a dataset. Table representation 424 depicts a table representation of expanded table 422 using the TaggedDocument( ) function, with the expanded and normalized column names of the table used as input words to the function.

Expanded table 432, labelled Customer Revenue, depicts an expanded form of another table in a dataset. Table representation 434 depicts a table representation of expanded table 432 using the TaggedDocument( ) function, with the expanded and normalized column names of the table used as input words to the function.

With reference to FIG. 5, this figure depicts a continued example of embedding based heterogenous dataset evaluation in accordance with an illustrative embodiment.

Table representations 510 includes table representations 414, 424, and 434 of FIG. 4, as well as additional table representations of additional tables. Trained document embedding model 520 generates table embeddings 530, with each table embedding in table embeddings 530 corresponding to a table representation in table representations 510.

With reference to FIG. 6, this figure depicts a continued example of embedding based heterogenous dataset evaluation in accordance with an illustrative embodiment. Responsive table ID module 330 is the same as responsive table ID module 330 in FIG. 3. Trained document embedding model 520 and table embeddings 530 are the same as trained document embedding model 520 and table embeddings 530 in FIG. 5.

As depicted, user query 610 is represented by query representation 620, using the TaggedDocument( ) function, with (possibly-expanded) words of the query used as input words to the function. Trained document embedding model 520 generates query embedding 630 from query representation 620.

Responsive table ID module 330 identifies responsive tables 640. Each table responsive tables 640 has a table embedding with a similarity score with query embedding 630 that is above a similarity score threshold, and thus includes data that is deemed responsive to the query. Module 330 provides responsive tables 640 to a user in response to the user's query, optionally ranked by their similarity scores.

With reference to FIG. 7, this figure depicts a continued example of embedding based heterogenous dataset evaluation in accordance with an illustrative embodiment. Responsive tables 640 is the same as responsive tables 640 in FIG. 6.

As depicted, compatibility scorer 710 computes a compatibility score between pairs of tables in responsive tables 640. The results are depicted in compatibility matrix 720, in which cells of the matrix hold compatibility scores between tables. Tables in responsive tables 640 with compatibility scores with each other above a compatibility score threshold as a set of compatible tables are depicted in query result 730, provided to a user in response to the user's query, optionally along with the tables' compatibility scores.

Figure 8:
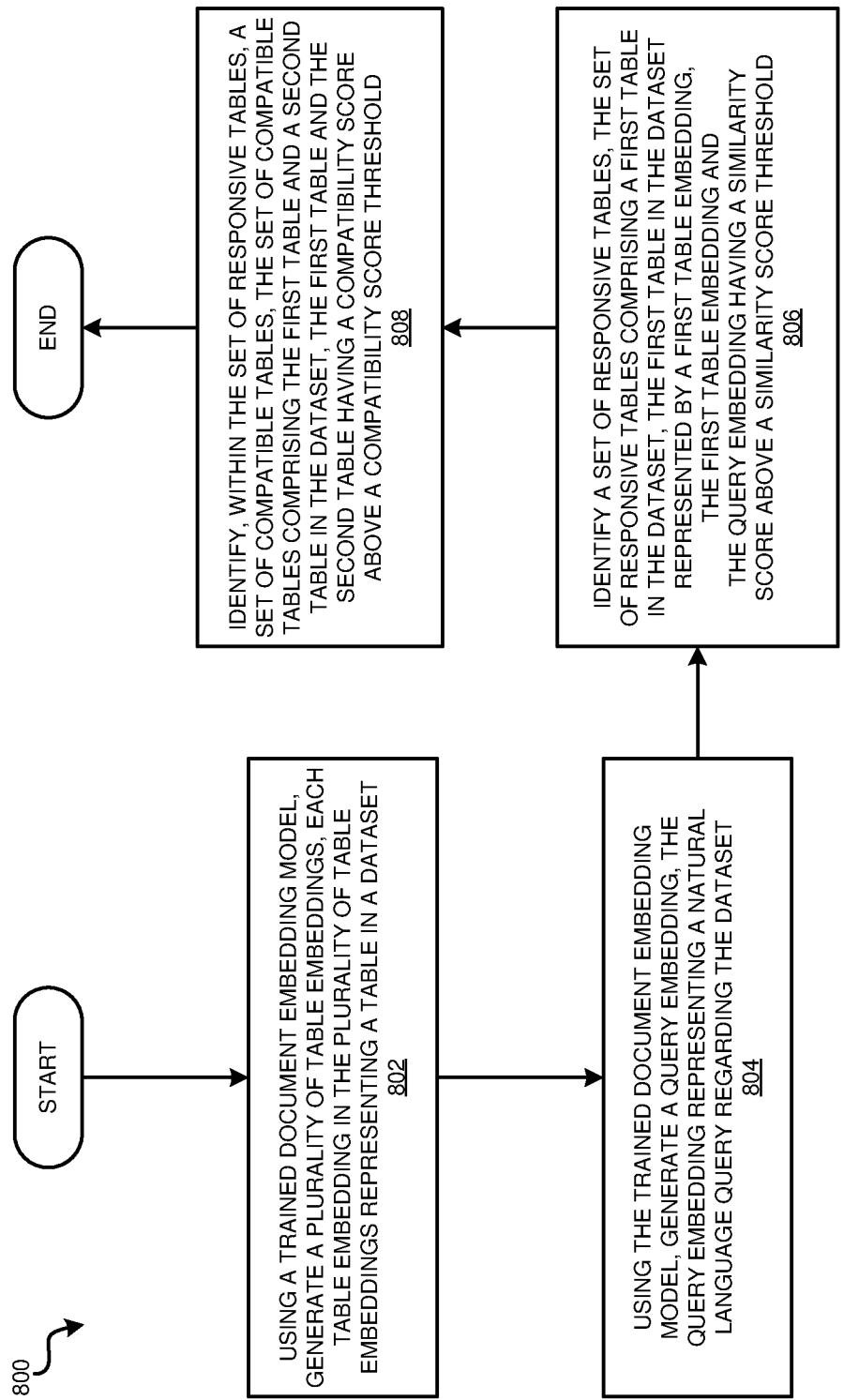
FIG. 8 depicts a flowchart of an example process for embedding based heterogenous dataset evaluation in accordance with an illustrative embodiment.

With reference to FIG. 8, this figure depicts a flowchart of an example process for embedding based heterogenous dataset evaluation in accordance with an illustrative embodiment. Process 800 can be implemented in application 300 in FIG. 3.

In the illustrated embodiment, at block 802, the process, using a trained document embedding model, generates a plurality of table embeddings, each table embedding in the plurality of table embeddings representing a table in a dataset. At block 804, the process, using the trained document embedding model, generates a query embedding, the query embedding representing a natural language query regarding the dataset. At block 806, the process identifies a set of responsive tables, the set of responsive tables comprising a first table in the dataset, the first table in the dataset represented by a first table embedding, the first table embedding and the query embedding having a similarity score above a similarity score threshold. At block 808, the process identifies, within the set of responsive tables, a set of compatible tables, the set of compatible tables comprising the first table and a second table in the dataset, the first table and the second table having a compatibility score above a compatibility score threshold. Then the process ends.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
inputting a heterogenous dataset including a table document into a trained document embedding model, the table document being represented in a structured form;
generating, by operating the trained document embedding model on the heterogenous dataset, a plurality of table embeddings, each table embedding in the plurality of table embeddings representing a corresponding table in the table document of the heterogenous dataset;
generating, by operating the trained document embedding model, a query embedding, the query embedding representing a natural language query regarding the heterogenous dataset;
identifying a set of responsive tables, the set of responsive tables comprising a first table in the heterogenous dataset, the first table in the heterogenous dataset represented by a first table embedding, the first table embedding and the query embedding having a similarity score above a similarity score threshold, wherein the similarity score is a ranked indication of responsiveness of heterogenous metadata of the first table to the natural language query, the ranked indication corresponding to a ranking of the first table relative to another responsive table within the set of responsive tables;

constructing a compatibility matrix table in the heterogenous dataset, wherein the compatibility matrix table comprises a set of logical columns intersecting a set of logical rows to define a set of logical cells;

configuring the heterogenous dataset to cause to determine a compatibility score of each responsive table in the set of responsive tables wherein the compatibility score is a logical representation of combinability of each responsive table to another responsive table within the set of responsive tables;

augmenting each logical cell of the set of logical cells to include the compatibility score of each responsive table in the set of responsive tables;

determining, by operating the trained document embedding model, that one of a quality measure of the first table and a value format of the first table causes the compatibility score in the compatibility matrix table in the heterogenous dataset of the first table to be above a compatibility threshold;

causing by operating the trained document embedding model to include, responsive to the natural language query, in a ranked list of tables from the set of responsive tables, the first table in response to the similarity score; and outputting, by the heterogenous dataset operating the trained document embedding model, responsive to the natural language query, the ranked list of tables using the compatibility score such that the heterogenous metadata of the heterogenous dataset is transformed to the ranked list of tables that are compatible with another responsive table and responsive to the natural language query.

2. The computer-implemented method of claim 1, wherein the generating a table embedding in the plurality of table embeddings comprises providing, as input to the trained document embedding model, the table document, the table document comprising a plurality of normalized column names of a table.

3. The computer-implemented method of claim 2, wherein the plurality of normalized column names comprises an expanded version of an abbreviated column name of the table.

4. The computer-implemented method of claim 1, wherein the generating the query embedding comprises providing, as input to the trained document embedding model, a query document, the query document comprising a plurality of words of the query.

5. The computer-implemented method of claim 1, further comprising:
ranking, according to a uniqueness score of each table in the set of responsive tables, the set of responsive tables.

6. The computer-implemented method of claim 1, further comprising:
identifying, within the set of responsive tables, a set of compatible matrix tables, the set of compatible matrix tables comprising the first table and a second table in the heterogenous dataset, the first table and the second table having the compatibility score above a compatibility score threshold.

7. A computer program product comprising a computer readable storage medium, and program instructions collectively stored on the computer readable storage medium, the program instructions executable by a processor to cause the processor to perform operations comprising:

inputting a heterogenous dataset including a table document into a trained document embedding model, the table document being represented in a structured form;

generating, by operating the trained document embedding model on the heterogenous dataset, a plurality of table embeddings, each table embedding in the plurality of table embeddings representing a corresponding table in the table document of the heterogenous dataset;

generating, by operating the trained document embedding model, a query embedding, the query embedding representing a natural language query regarding the heterogenous dataset;

identifying a set of responsive tables, the set of responsive tables comprising a first table in the heterogenous dataset, the first table in the heterogenous dataset represented by a first table embedding, the first table embedding and the query embedding having a similarity score above a similarity score threshold, wherein the similarity score is a ranked indication of responsiveness of heterogenous metadata of the first table to the natural language query, the ranked indication corresponding to a ranking of the first table relative to another responsive table within the set of responsive tables;

constructing a compatibility matrix table in the heterogenous dataset, wherein the compatibility matrix table comprises a set of logical columns intersecting a set of logical rows to define a set of logical cells;

configuring the heterogenous dataset to cause to determine a compatibility score of each responsive table in the set of responsive tables wherein the compatibility score is a logical representation of combinability of each responsive table to another responsive table within the set of responsive tables;

augmenting each logical cell of the set of logical cells to include the compatibility score of each responsive table in the set of responsive tables;

determining, by operating the trained document embedding model, that one of a quality measure of the first table and a value format of the first table causes the compatibility score in the compatibility matrix table in the heterogenous dataset of the first table to be above a compatibility threshold;

causing by operating the trained document embedding model to include, responsive to the natural language query, in a ranked list of tables from the set of responsive tables, the first table in response to the similarity score; and outputting, by the heterogenous dataset operating the trained document embedding model, responsive to the natural language query, the ranked list of tables using the compatibility score such that the heterogenous metadata of the heterogenous dataset is transformed to the ranked list of tables that are compatible to another responsive table and responsive to the natural language query.

8. The computer program product of claim 7, wherein the stored program instructions are stored in a computer readable storage device in a data processing system, and wherein the stored program instructions are transferred over a network from a remote data processing system.

9. The computer program product of claim 7, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
  program instructions to meter a resource usage of the program instructions associated with the request; and
  program instructions to generate an invoice based on a metered resource usage.

10. The computer program product of claim 7, wherein the generating a table embedding in the plurality of table embeddings comprises providing, as input to the trained document embedding model, the table document, the table document comprising a plurality of normalized column names of a table.

11. The computer program product of claim 10, wherein the plurality of normalized column names comprises an expanded version of an abbreviated column name of the table.

12. The computer program product of claim 7, wherein the generating the query embedding comprises providing, as input to the trained document embedding model, a query document, the query document comprising a plurality of words of the query.

13. The computer program product of claim 7, further comprising:
  ranking, according to a uniqueness score of each table in the set of responsive tables, the set of responsive tables.

14. The computer program product of claim 7, further comprising:
  identifying, within the set of responsive tables, a set of compatible matrix tables, the set of compatible matrix tables comprising the first table and a second table in the heterogenous dataset, the first table and the second table having the compatibility score above a compatibility score threshold.

15. A computer system comprising a processor and a computer readable storage medium, and program instructions collectively stored on the computer readable storage medium, the program instructions executable by the processor to cause the processor to perform operations comprising:
  modifying a heterogenous dataset comprising heterogenous metadata, the modifying comprising:
  inputting the heterogenous dataset including a table document into a trained document embedding model, the table document being represented in a structured form;
  generating, by operating the trained document embedding model on the heterogenous dataset, a plurality of table embeddings, each table embedding in the plurality of table embeddings representing a corresponding table in the table document of the heterogenous dataset;
  generating, by operating the trained document embedding model, a query embedding, the query embedding representing a natural language query regarding the heterogenous dataset;
  identifying a set of responsive tables, the set of responsive tables comprising a first table in the heterogenous dataset, the first table in the heterogenous dataset represented by a first table embedding, the first table embedding and the query embedding having a similarity score above a similarity score threshold, wherein the similarity score is a ranked indication of responsiveness of heterogenous metadata of the first table to the natural language query, the ranked indication corresponding to a ranking of the first table relative to another responsive table within the set of responsive tables;
  constructing a compatibility matrix table in the heterogenous dataset, wherein the compatibility matrix table comprises a set of logical columns intersecting a set of logical rows to define a set of logical cells;
  configuring the heterogenous dataset to cause to determine a compatibility score of each responsive table in the set of responsive tables wherein the compatibility score is a logical representation of combinability of each responsive table to another responsive table within the set of responsive tables;
  augmenting each logical cell of the set of logical cells to include the compatibility score of each responsive table in the set of responsive tables;
  determining, by operating the trained document embedding model, that one of a quality measure of the first table and a value format of the first table causes the compatibility score in the compatibility matrix table in the heterogenous dataset of the first table to be above a compatibility threshold;
  causing by operating the trained document embedding model to include, responsive to the natural language query, in a ranked list of tables from the set of responsive tables, the first table in response to the similarity score; and
  outputting, by the heterogenous dataset operating the trained document embedding model, responsive to the natural language query, the ranked list of tables using the compatibility score such that the heterogenous metadata of the heterogenous dataset is transformed to the ranked list of tables that are compatible to another responsive table and responsive to the natural language query.

16. The computer system of claim 15, wherein the generating a table embedding in the plurality of table embeddings comprises providing, as input to the trained document embedding model, the table document, the table document comprising a plurality of normalized column names of a table.

17. The computer system of claim 16, wherein the plurality of normalized column names comprises an expanded version of an abbreviated column name of the table.

18. The computer system of claim 15, wherein the generating the query embedding comprises providing, as input to the trained document embedding model, a query document, the query document comprising a plurality of words of the query.

19. The computer system of claim 15, further comprising:
  ranking, according to a uniqueness score of each table in the set of responsive tables, the set of responsive tables.

20. The computer system of claim 15, further comprising:
  identifying, within the set of responsive tables, a set of compatible matrix tables, the set of compatible matrix tables comprising the first table and a second table in the heterogenous dataset, the first table and the second table having the compatibility score above a compatibility score threshold.

* * * * *